United States Patent [19]

Young

[11] Patent Number: 6,058,180

[45] Date of Patent: May 2, 2000

[54] AUTOMATIC PERSON-FOLLOWING COMMUNICATION SYSTEM

[75] Inventor: Rodney E. Young, Plantation, Fla.

[73] Assignee: Eagletech Communications, Inc., Ft. Lauderdale, Fla.

[21] Appl. No.: 08/819,206

[22] Filed: Mar. 17, 1997

[51] Int. Cl.[7] .................................................. H04M 3/42
[52] U.S. Cl. ...................... 379/234; 379/88.07; 379/210; 379/355
[58] Field of Search .................... 379/67.1, 88.07, 379/88.1, 88.17, 88.22, 88.25, 201, 210, 211, 212, 213, 229, 231, 232, 233, 234, 355

[56] References Cited

U.S. PATENT DOCUMENTS

| | | | |
|---|---|---|---|
| 3,491,213 | 1/1970 | Gilboy et al. ............................. | 179/18 |
| 4,914,690 | 4/1990 | Hagedorn ................................ | 379/233 |
| 4,930,153 | 5/1990 | Hagedorn ................................ | 379/233 |
| 4,975,941 | 12/1990 | Morganstein et al. ................... | 379/88 |
| 5,193,110 | 3/1993 | Jones et al. .............................. | 379/94 |
| 5,392,342 | 2/1995 | Rosenthal ............................. | 379/201 X |
| 5,479,491 | 12/1995 | Herrero Garcia et al. ............. | 379/211 |
| 5,535,269 | 7/1996 | Hamada ................................. | 379/233 |
| 5,563,940 | 10/1996 | Tsuzuki et al. ........................ | 379/233 |
| 5,586,169 | 12/1996 | Pinard et al. ............................. | 379/59 |
| 5,896,448 | 4/1999 | Holt ................................... | 379/201 X |
| 5,937,047 | 2/1995 | Stabler ................................... | 379/201 |

*Primary Examiner*—Scott L. Weaver
*Attorney, Agent, or Firm*—Quarles & Brady LLP

[57] ABSTRACT

In accordance with the invention, there is provided an automatic person-following system for a telephone switching machine having at least one 2-way DID trunk operative for receiving incoming and transmitting outgoing calls, a 3-way calling feature connectable to the trunk, a bank of data storage cells accessible from the DID trunk, each cell having storage capacity for storing at least one pre-recorded voice message, at least one incoming voice message, and at least one pre-recorded telephone number; signaling apparatus for signaling a hookswitch flash to the DID trunk, and dialing apparatus for dialing the pre-recorded telephone number to the DID-trunk after sending a hookswitch flash signal.

16 Claims, 5 Drawing Sheets

AUTOMATIC PERSON-FOLLOWING COMMUNICATION SYSTEM

The invention relates to a telephone call response and processing system, especially directed to providing comprehensive call processing features for facilitating completion of incoming telephone calls and avoidance of loss of telephone calls.

BACKGROUND AND STATE OF ART

Modern living is characterized by people being highly mobile, and as a result, communication between persons, often away from their offices or residences, has spawned need for new modes of communication interchanging. Well known of such recent new modes of communication are for example mobile communications in the form of e.g. cellular mobile radio, person paging systems and voice mail. Each of these relatively recent technologies have made it considerably easier to locate and reach persons frequently away from their normal base of operation.

Even with aid of these new technologies, it is still often difficult or impossible to communicate with a person who is highly mobile.

The present invention is directed to overcoming the problem of reaching a person who is mobile and at the same time wants to be able to receive his or her messages, regardless of where he is at the time of a call. Along the same line this person may also wish to have a record of any caller who has attempted to reach him if he had not been able to answer the call.

In the known art, U.S. Pat. No. 5,193,110 describes an integrated services platform for telephone communication. This patent describes a system including a plurality of application processing parts for providing different types of information services through the telephone system.

U.S. Pat. No. 4,914,690 and 4.930,15 describe a universal PBX-to-central office interface for standards conversion for supporting normally incompatible telephone equipment in a PBX environment, and an interface which attaches between an incoming trunk line from a central office and a PBX which monitors the communication between the central office and the PBX and records signals between the central office and the PBX for later downloading to telephone peripheral equipment attached to the PBX, such as voice mail and the like.

U.S. Pat. No. 4,975,941 describes an intercept system for integrating personalized services of switchboard attendants associated with on-premises PBX switching systems enabling the calling parties to complete their own calls when the telephone extension numbers of the called parties are known to the calling parties.

A considerable body of art is directed to enhancing and/or facilitating the process of reaching a person who is in proximity to a telephone line of a central office or a PABX. The known art, however, suffers from the drawback that human intervention is almost always required in completing such calls, and in addition, considerable investments are required in switching apparatus to perform these services.

SUMMARY OF THE INVENTION

The present invention overcomes the drawbacks of the known art by combining features that have recently become tariffed and are available in central office switching technology.

The invention is based on a combination of so-called two-way direct-inward-dialing trunks and the three-way calling feature.

In its preferred embodiment the method of the invention can be applied to central office PBX systems, key systems and to single line telephones, and also to cellular phones ("cell phones") and pagers to provide an automatic comprehensive person following service.

Applicant has developed an enhanced telephone services platform using the concept of Computer Telephone Integration (CTI) which provides basic voice mail, fax mail, fax-on-demand, and enhanced services such as One-Number-Follow Me transfers. The platform as contemplated is to be marketed and deployed as Consumer Premises Equipment (CPE) as well as in industrial version in a Service Bureau setting.

Over the years the telephone industry has had only limited ability to provide enhanced services from the central office on a wide scale basis, which has given the CTI industry an opportunity to develop CPE, which can be widely available to any person or business to be installed behind its switching facility to give that business those enhanced services. For about a dozen years central office switches have used Signaling System 7 (SS7) software controls which have allowed addition of Intelligent Network (IN) or in the U.S. Advanced Intelligent Network equipment (AIN) and Intelligent Peripherals to provide enhanced services. Deployment of AIN has, however, been disappointing.

The Public Switched Telephone Network (PSTN) has been based essentially on Bellcore—the Regional Bell Operating Companies (RBOC's) of Bell Labs to develop standards for any equipment which is attached to the PSTN. In the case of AIN, Bellcore has developed standards, and equipment vendors have designed and manufactured specified equipment to the RBOCIS. In the CTI industry the process is quite the opposite. Entrepreneurs have developed CTI platforms capable of providing enhanced services.

Direct Inward Dial or DID is a standard service provided by a central office to the customer's premises. The signaling can be analog, also known as E & M, or digital, known as D-carrier in e.g., T-1 format. The T-1 format includes signaling such as on/off hook, and/or ringing which tells a CTI platform which phone numbers are dialed. For example, in a CTI Service Bureau setting, a T-1 format will supply 24 multiplexed telephone lines reachable by thousands of phone numbers for the service bureau customers. Typically DID trunks can initiate calls in one direction only, outbound from the central office. If one were to hook a telephone to such a one-way DID line one would get no dial tone. Issue #042 of the Bell standard describes a 2-way DID trunk that has dial tone and allows outward dialing, and has as well the ability to receive flash hook to get a second dial tone during an inbound call. This gives in a CTI service bureau application an ability to offer enhanced AIN services, such as One-Number-Follow Me, from a remote site not connected to the central office switch. This feature allows a CTI platform to switch calls exactly like a central office.

The invention is based on using the 2-way DID-trunk combined with the 3-way calling feature which are available as standard tariffed features. The invention is further based on using a digital carrier format, such as e.g. the standard T-1 carrier format, which provides 24 voice and signaling channels on a 1.544 megabit/sec carrier channel. The T-1 carrier format is readily implemented by means of a so-called per se conventional digital board or module, which provides a seamless digital interface with a standard e.g. T-1 carrier format, and additionally provides voice and tone interpretation for all, e.g. 24 channels of the T-1 carrier on a time division basis. The digital board also provides time-divided interfacing with a bank of recorded and recording voice channels. These voice channels are structured to provide and record voice messages in the standard e.g. D-1 carrier format, as will be described in more detail below.

A description of various digital carrier formats can be found in, for example, *Electronic Engineers Handbook* by Donald G. Fink, et al. issued by McGraw Hill Book Company, and other sources.

The invention contemplates for example, reselling Local Exchange Service along with enhanced services, long distance resale, cellular and PCS resale, pagers and Internet access, bundled together and billed on one invoice.

In accordance with the invention, there is provided an automatic person-following system for a telephone switching machine having at least one 2-way DID trunk operative for receiving incoming and transmitting outgoing calls, a 3-way calling feature connectable to the trunk, a bank of data storage cells accessible from the DID trunk, each cell having storage capacity for storing at least one pre-recorded voice message, at least one incoming voice message, and at least one pre-recorded telephone number; signaling apparatus for signaling a hookswitch flash to the DID trunk, and dialing apparatus for dialing the pre-recorded telephone number to the DID-trunk after sending a hookswitch flash signal.

According to a further feature there is provided an automatic person-following system wherein the switching machine is a digital switching machine, and the DID trunk is connected with a terminal of the digital switching machine, the terminal being operative in pulse code modulation format, and further including a digital sound processing module operative for digitally processing in time-sharing, multi-channel mode sounds in a digital format compatible with the terminal.

According to another feature, there is provided an automatic person-following system wherein the digital format is a D-carrier format.

According to an additional mode, there is provided an automatic person-following system wherein the digital sound processing module includes apparatus for digitally processing digital sound signals representing sounds including at least one of dial tone, ringback tone, busy tone, human voice, recorded voice and dual-tone multi-frequency dialing tones, wherein the pulse code modulation format is composed of a plurality of pulse frames, each frame including eight bits representing a binary coded sample of the sounds, and further the pulse code modulation format includes signaling bits enmeshed in the frames, and wherein the signaling bits represent one of on-hook and off-hook condition of the hookswitch flash.

According to a further feature, there is provided and automatic person-following system wherein the pulse code modulation format includes companding of the sound.

In the automatic person-following system according to the invention, the hookswitch flash can be equal to a timed absence of the signaling bit, and wherein further a digital computer is operative for digitally communicating with the sound processing module.

Furthermore, the digital computer may include storage apparatus for storing numbers and sounds in retrievable format.

The aforesaid digital computer may further include apparatus for presenting the numbers and sounds in response to an interrupt signal from the digital module.

According to the inventive concept, the numbers and sounds are in the form of records, each record having an address, and storage for at least one pre-recorded message, at least one incoming message and at least one pre-recorded telephone number, and wherein further the pre-recorded telephone number can be a called number.

The automatic person-following system of the invention may provide that the pre-recorded message includes at least a greeting and a directory.

Further objects and advantages of this invention will be apparent from the following detailed description of the presently preferred embodiments which are illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
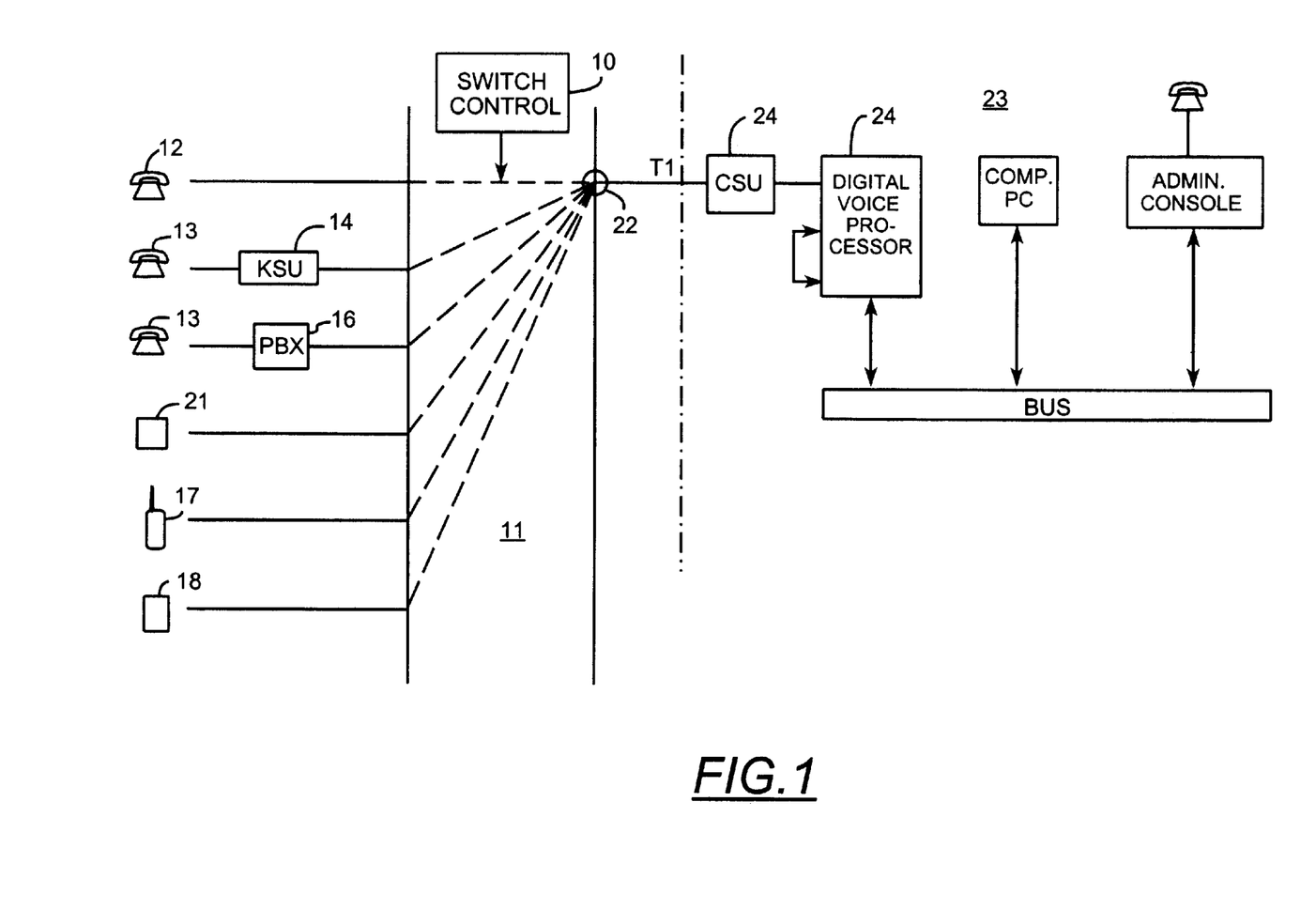
FIG. 1 is a simplified block diagram of the major building blocks of the invention.

FIG. 1 shows in block diagram form a switching system 11 of general nature. It may be a central office switching system or a combination of interconnected central office, PABX, and tandem switches capable of accommodating a wide variety of subscribers such as e.g. a conventional telephone 12, a telephone 13 behind a key system KSU 14, a cellular phone 17 or a pager 18, etc. A terminal device 22, preferably in the form of a T-1 PCM terminal, is capable of being reached via a telephone switching system 11. In a wider context the terminal device 22 may be a digital communications module that can be activated by a T-1 carrier signal and capable of performing various signaling and digital signal processing functions when reached by instructions transmitted in the form of DTMF signals ("Dual-Tone Multi-Frequency") illustrated as a box 24.

The switching system 11 is controlled generally by a switch control 10 of conventional construction, and need not be described in further detail, since such control systems are widely used in modern switching technology.

The switching system has a termination 22 in the form of a PCM carrier terminal, operating for example in conventional T1-carrier format. It is to be understood that several other carrier formats are in use, and the invention is not limited to only T-1 carrier, but can be practiced in any other type digital carrier capable of transmitting a number of voice and signaling channels over a common transmission path. The invention is described by reference to conventional T1-PCM carrier, which is now widely used.

Figure 2:
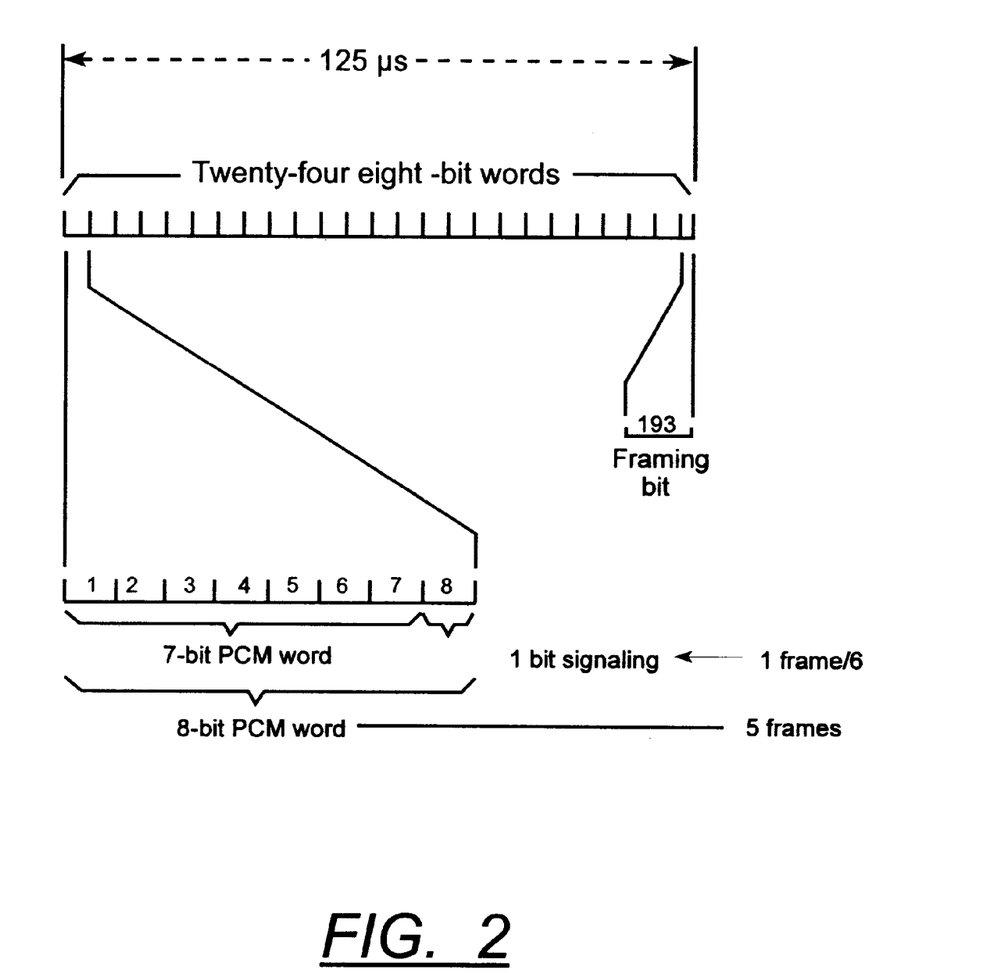
FIG. 2 is an exemplary layout of a PCN carrier frame format.

The format of T1-PCM carrier is shown in FIG. 2. In this format there are 24 8-bit channels together forming one frame. Each channel is formed by an 8-bit word. The eighth bit in each channel is used in every sixth frame as a signaling bit, indicating on-off hook condition of that channel. Each frame is repeated every 125 micro-seconds, providing a sampling rate of 8000 binary samples per second, giving a Nyquist bandwidth of 4000 Hz, as is customary for telephone voice bands.

In FIG. 1 a user premises installation is shown under 23, and is composed of an optional conventional channel service unit CSU which conditions the T-1 line to accommodate the PCM format.

On the user premises there is a Digital Voice Processor 24 which provides digital signal processing in 24 time-divided channels. By means of digital signal processing the processor 24 can detect presence of various sounds and tones on each of the 24 PCM channels, including the nature of each type of sound or tone. In particular, the processor 24 is capable of determining if a tone in any channel is dial tone, ring-back tone, busy tone, or fast busy tone indicating "no path available" condition. In addition the signal processor is capable of sensing voice, and it is further capable of identifying whether the voice is spoken by a human or generated by a recording device. This it does by analyzing the cadence of the syllables of the voice signal. It follows that the processor 24 is also capable of identifying absence of voice and presence of tones appearing within a given time delay or interval.

The presently preferred digital processor is made by Dialogic Corporation and is marketed under the product designation D/240SC-T1™, and its operation and structural composition is described in that firm's product bulletin D/240SC-T1™, from which the following description is excerpted, and to which reference should be had for more detailed description. A block diagram of the digital processor is shown in the upper part 24 of FIG. 3. That block diagram is copied from the aforesaid product description.

The processor spans 24 channels of voice processing per digital module 24 and creates a cost effective switching solution with its 1024 time slot capacity; it provides the capability to build higher density systems and large, multi-node systems through SCxbus™ interbox communications. Downloadable signal and call processing firmware called SpringWare™, provides easy feature enhancement and reliable detection during voice playback.

It includes three independent Motorola DSP56002 Digital Signal Processors 30, clocked at 66 MHz, each having a private, high-speed SRAM 28, which permits execution of high performance SpringWare signal processing algorithms.

Two Intel 486 GX microprocessors offload call processing tasks from a host PC 50, giving more power to the application.

A C language application program interfaces MS-DOS®, UNIX®, OS/2® and Windows NT®.

The digital processor 24 provides the following features: Voice messaging, interactive voice reponse, debit card and international call back, audiotex, operator services, telemarketing/call center, dictation, auto dialers, notification systems, and on-line data entry/query, not all of which are used in the present application.

A digital processor provides T-/DSX-1 ISDN Primary Rate service termination and call processing for up to 24 voice channels in a single PC channel. A unique dual-processor architecture, comprising DSPs (Digital Signal Processors) and general-purpose microprocessors, handles all telephony signaling and performs all DTMF (touchtone) and audio/voice signal processing tasks. The D/240SC-T1 24 board is a member of a DIALOG/HD High Density series of products, and is based upon Signal Computing System Architecture™ (SCSA™). SCSA provides an open architecture that enables developers to use products from multiple vendors to build a unified computer telephony solution. SCSA provides features such as distributed switching, logical addressing, and location-independent resource management. DIALOG/HD products provide the flexibility to support SCbus-based applications or existing PCM Expansion Bus™ (PEB™)-based applications. DIALOG/HD products are compatible with many exiting PEB-based applications.

SpringWare™ algorithms are executed by an on-board digital signal processor, and provide variable voice coding at 24 and/or 32 Kb/s PCM format. Sampling rates and coding methods are selectable on a channel-by-channel basis. Applications may dynamically switch sampling rate and coding method to optimize data storage or voice quality as the need arises. The SpringWAre firmware also provides reliable DTMF detection, DTMF cut-through, and talk off/ play off suppression over a wide variety of telephone line conditions.

The digital processor 24 provides a set of features, including state-of-the-art DSP technology and signal processing algorithms, for building a core of a telephony system. With industry-standard ISA bus expansion boards and a variety of channel densities to choose from, Dialogic voice products can be integrated into the type of system required.

The digital processor 24-port voice board provides the following:

a) connects to 24 telephone channels, b) automatically answers calls, c) detects touchtones, d) plays voice messages to a caller, e) digitizes, compresses and records voice signals, and f) places outbound calls and automatically reports the results all in real time on all channels.

The digital processor board installs in IBM® PC AT® (ISA bus) and compatible computers (80386 and Pentium™-based PC platforms). The board occupies a single expansion slot and up to 16 boards can be configured in a system with each board sharing the same interrupt level. The maximum number of lines that can be supported is dependent on the application, the amount of disk I/O capacity required and the host computer CPU, power supply and the operating system being used.

The Dialogic ISDN Primary Rate Interface (PRI) Access firmware is a feature enhancement to the DIALOG/HD Voice and Switching Products Series. The Dialogic PRI firmware is approved for use with many popular switch protocols and in major telecommunications markets worldwide. Features and benefits of ISDN PRI include:

a) ISDN Primary Rate connectivity to Dialogic computer telephony systems.

b) Downloadable firmware which yields 24-port voice processing plus PRI access in a single slot.

c) Dialed Number Identification Service (DNIS) which enables application to automatically identify the purpose of the incoming call.

d) Automatic Number Identification (ANI), which enables application to identify the calling party.

e) ANI-on-Demand feature which saves money by selectively requesting ANI information only when needed.

f) ISDN offers inherent benefits to call center application with its fast call setup and fast retrieval of DNIS and ANI information on inbound calls.

g) Vari-A-Bill®, which enables service bureaus to change the billing rate of a 900 call, on the fly.

h) Call-By-Service Selection, which allows an application to select the most efficient bearer channel service on a call-by-call basis.

j) Non-Facility Associated Signaling (NFAS) saves on D channel expenses by allowing multiple spans to be controlled by a single D channel.

k) Subaddressing allows direct connection to individual extensions or devices sharing the same phone number, or, as a proprietary messaging mechanism.

l) Universal software API, which simplifies access for developers who are unfamiliar with ISDN, yet enables sophisticated control of features.

m) Multinational approvals with many popular switch protocols.

n) User-to_User Information which allows an application to send proprietary messages to remote systems during call establishment.

o) Facility, Notify and optional information elements allow applications to work with network-specific supplementary services.

Software support is arranged as follows:

The D/240SC-T1 is supported by Dialogic System Software and Software Developments Kits for MS-DOS, OS/2, UNIX and Windows NT. These packages contain a set of tools for developing complex multichannel applications.

The D/240SC-T1 module connects directly to a channel service unit (CSU), digital service unit (DSU), or to other network terminating equipment. For D/240SC-T1 systems, the CSU must support the D4 or ESF (within ISDN) superframe format. Most functions traditionally performed by a DSU (such as unipolar to bipolar format conversion, framing, etc.) are performed by the D/240SC-T1 board. The only exception is the ability to interpret certain bipolar violation patterns, such as loopback start and stop commands from the T-1 network.

The D/240SC-T1 board processes the digital on-hook/off-hook signaling information and digital voice signals from the telephone network. Digital T-1 signals from the telephone network enter the D/240SC-T1 board via a TLXC line interface (see Block Diagram). The line interface contains a software switchable clock which can be set to:

a) loop (clocking is slaved to the external network b) independent (clocking is derived from an on-board oscillator)

c) expansion (clocking is slaved to another clock master board)

Referring now to the upper part 24 of FIG. 1, the incoming T-1 bit stream is applied to an SC2000 chip 26*a* that acts as a traffic coordinator for each channel and to interface this data stream to the 27 SCbus 27. This serial bit stream contains the digitized voice data and the signaling information for the incoming call.

Each of three SC2000 26*a*,26*b*,26*c* chips transmit several lower speed data streams over a single high speed channel, either the SCbus or PEB bus 27. The bus configuration is set when the firmware is downloaded at system initialization. These chips incorporate matrix switching capabilities. Under control of an on-board control processor, an SC2000 chip can connect a call being processed or an available external resource, such as speech recognition, facsimile or TTS.

Each of the DSP (Digital Signal Processor) resources receive digital data via an SC2000 chip. The DSP processes the digitized voice data based on SpringWare firmware loaded in code/data RAM. Each DSP performs the following signal analysis and operations on this incoming data stream:

a) automatic gain control to compensate for variations in the level of the incoming signal, b) application of an ADPCM (Adaptive Differential Pulse Code Modulation) or PCM (Pulse Code Modulation) algorithm to compress the digitized voice and save disk storage space, c) detection of the presence of tones—DTMF, MF, or an application-defined single or dual tone, d) silence detection to determine whether the line is quiet and if the caller is not responding. For outbound data, the DSP performs the following operations:

e) expansion of stored, compressed audio data for playback, f) adjusting of the volume and rate of speed of playback upon application or user request, g) generating of tones—DTMF,MF, or any application-defined general purpose tone. The dual-processor combination also performs outbound dialing and call progress monitoring:

h) transmitting of off-hook signal to the telephone network, g) out-dialing (makes an outbound call), j) monitoring and reporting of results: line busy or congested; operator intercept; ring, no answer; or if the call is answered, whether answered by a person, an answering machine, a facsimile or a modem.

When recording speech, the DSP can use different digitizing rates from 24 to 64 Kb/s as selected by the application for the best speech quality and most efficient storage. The digitizing rate is selected on a channel-by channel basis and can be changed each time a record or play function is initiated. The DSP-processed speech is transmitted by the control processor to the host PC for disk storage. When playing back a stored file, the processor retrieves the voice information from the host PC and passes it to the DSP, which converts the file into digitized voice. The DSP uses the SCbus circuitry to send the digitized voice responses to the caller via the TLXC line interface.

For SCbus configurations, the external SCbus and internal local bus may operate at 2.048 Mb/s. For PEB configurations, the external PEB and the internal local bus may operate at 1.544 Mb/s.

A pair of High-level Data Link Controllers (HDLC) control access to a SCbus message bus. This message bus is a separate SCbus channel that carries messages and control information between SCSA devices, such as out-of-band signaling and collision detection and resolution. Out-of-band signaling enables faster response time to the messages and control information carries on the dedicated message channel. Bus contention and resolution capability uses a set of fixed and rotating guidelines to detect when two devices are trying to access the same SCbus slot and resolves these situations so that each resource has equal access to the SCbus.

The on-board control processors control all operations of the D/240SC-T1 board via a local bus and interpret and execute commands from the host PC 50. These processors handle real-time events, manage data flow to the host PC to provide faster system response time, reduce PC host processing demands, process DTMF and telephony signaling before passing them to the application, and free the DSPs to perform signal processing.

Communications between a processor and the host PC is performed via the Shared RAM which acts as an input/output buffer and thus increases the efficiency of disk file transfers. This RAM interfaces to the host PC via the ISA bus. All operations are interrupt-driven to meet the demands of real-time systems. When the system is initialized, Spring-Ware firmware is downloaded from the host PC to the on-board code/data RAM and DSP RAM to control all board operations. This downloadable firmware gives the board all of its intelligence and enables easy feature enhancement and upgrades.

The Traffic Controller ASIC is the 80486 Control Processor interface that handles all peripheral devices (SC2000, HDLC, DSPs, TIXC) and host PC functions (Board Locator Technology™, programmable interrupts, and Shared RAM). The Board Locator Technology circuit inside the Traffic Controller ASIC 81 operates in conjunction with a rotary switch 82, eliminating the need to set confusing jumpers or DIP switches. The Board Locator Technology is used to map all D/240SC-T1 boards' Shared RAM to the same PC memory space.

Figure 3:
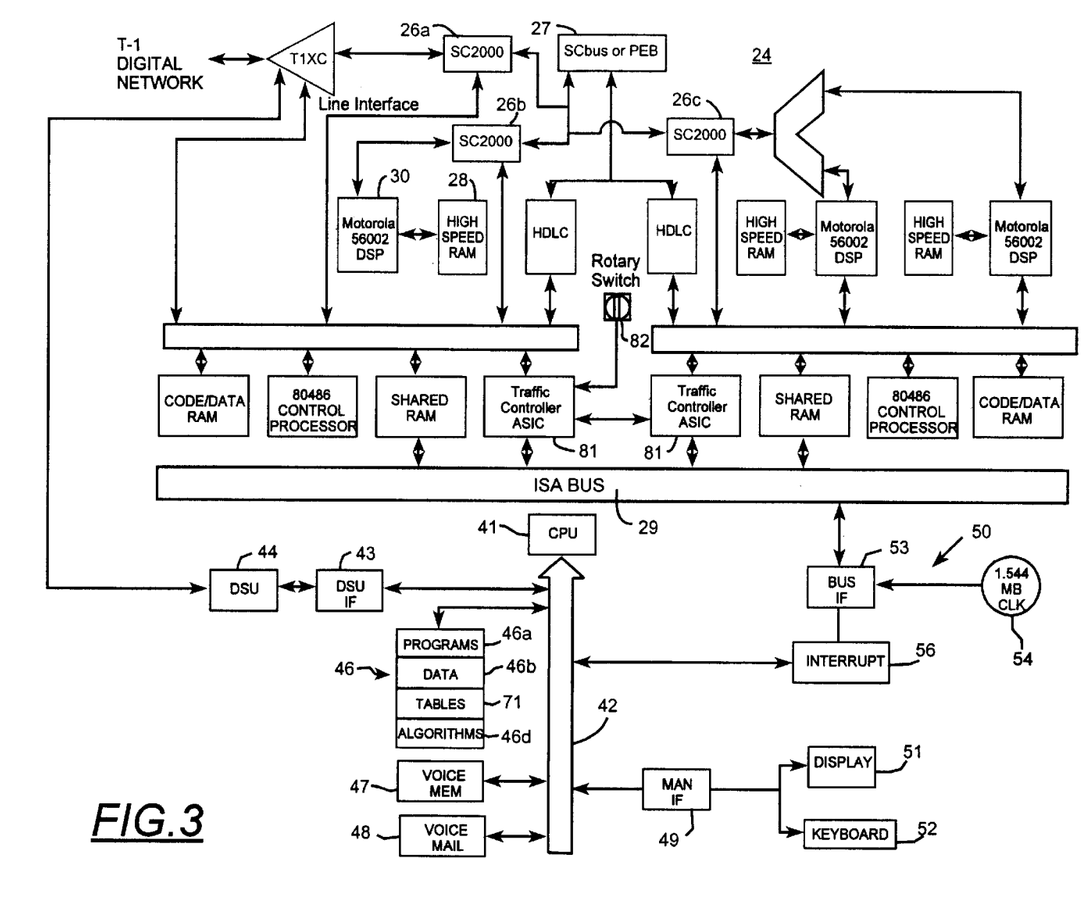
FIG. 3 is a more detailed block diagram of the invention showing the digital signal-processing module, combined with a digital computer.

FIG. 3 shows a PC (Personal Computer) of any suitable make which interfaces with the Dialogic digital signal processor module 24.

A central processing module 41 is connected via a data bus 42 to the digital module 24 via a digital service unit interface 43 (DSUIF), and a digital service unit DSU. The digital service unit provides time slot interfacing and compatiblity between the clock rate of the CPU 41 and the digital network line interface TIXC. A memory section 46, also connected to the CPU bus 42, contains in memory programs 46a required to operate the system, described in more detail below, data bases 46b, data tables 71 and various control algorithms 46d. A voice memory 47 serves to store digitally formatted recorded messages that are called on demand and storage space for temporary storage of pre-recorded messages as required to interface with persons making calls to the system.

A voice mail memory 48 partitioned into user segments serves to store voice mail messages as required.

A manual interface 49 connects the CPU and bus 42 with a maintenance and administration facility composed e.g. of a display module 51 and a keyboard 52.

A bus interface 53 having access to the T-1 carrier clock rate of 1.544 megabits/sec at 54 allows synchronous insertion of digitized voice from the voice memory 47 and voice mail 48 into the ISA bus of the digital board 24. An interrupt facility 56 can interrupt the CPU 41, either by software or hardware to provide transfer of voice messages or data between the digital module 24 and the CPU 41 when required.

Figure 4:
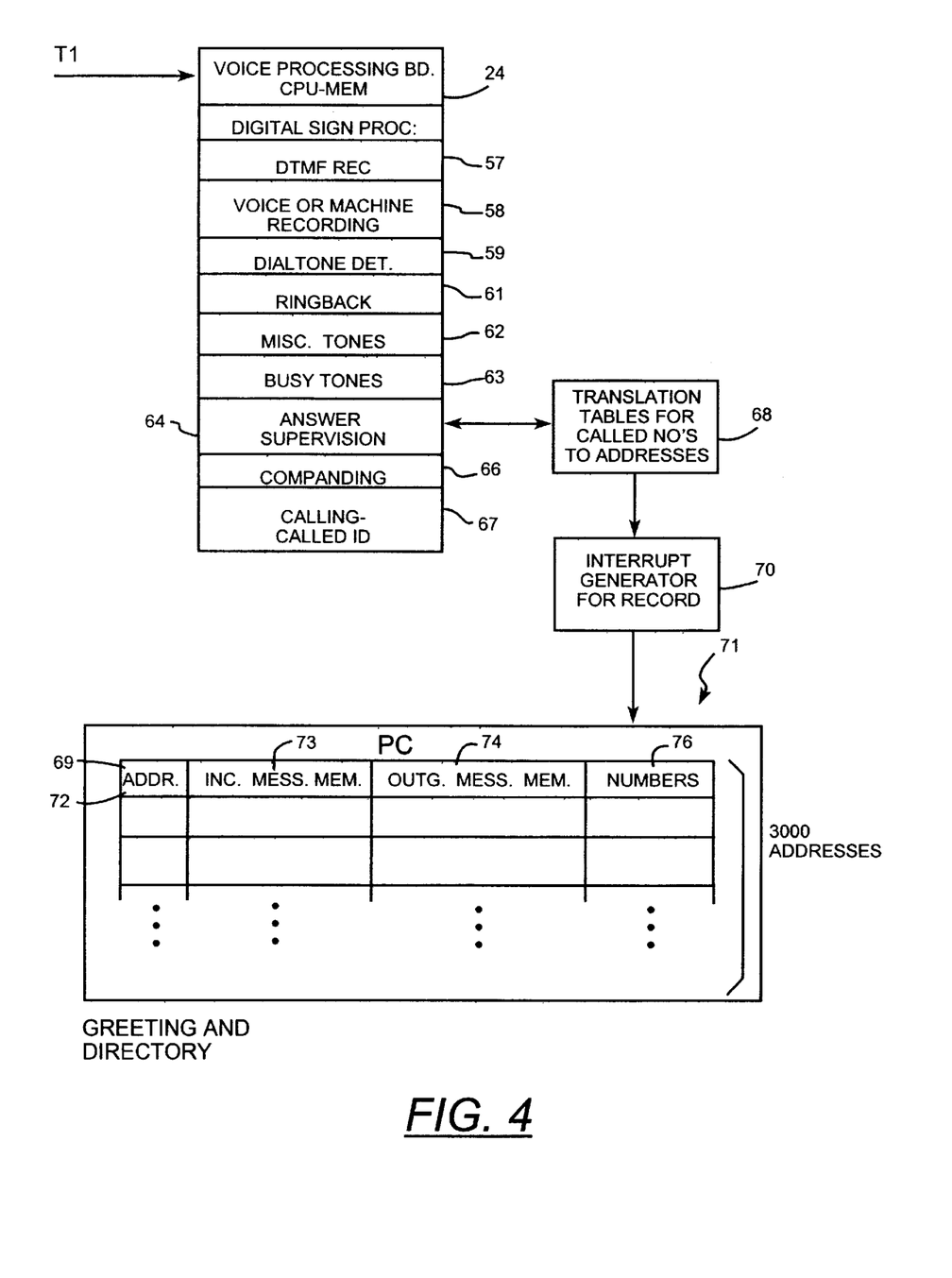
FIG. 4 is a functional block diagram of the invention showing the general table structure.

FIG. 4 is a block diagram showing details of the voice and message management of the system. FIG. 4 shows the general table layout of the digital processor 24. The digital processor 24 includes digital tone and voice processing modules capable of receiving and converting to digital equivalents various tones, such as a DTMF receiving module 57 which operates to convert tone signals from a DTMF telephone key pad, a voice or machine recording module 58 which is capable of determining whether an incoming voice message originates from a machine recording or a human. This determination is performed by measuring the cadence of the voice syllables, which is different from machine recordings, to human voice. A dial tone detector 59 operates to detect preferably standard dial tone. A ring-back tone detector 61 detects presence of ringback tone. A miscellaneous tone detector 62 is available to detect other miscellaneous tones as are from time to time used in telephone connections, and a busy tone detector 63 is capable of detecting regular and/or fast busy tone.

An answer supervision module 64 detects presence or absence of the supervisory bit, i.e. the one-bit signaling bit in 1 frame /6 in FIG. 2.

Companding of the digital format is performed in module 66 in accordance with one of several companding laws, e.g. A-law, A $\mu$-law and others in order to minimize voice channel noise, as is well known from digital voice transmission.

A called and/or calling party identifying module 67 provides called and/or calling party identity. The calling party identity, if used, is activated by means of an ANI activation signal transmitted to the digital switch, if available.

A translation table 68 provides translation from the called party number, as dialed in by DTMF signaling from the calling party, to the appropriate address ADDR 69 in the data table of the computer 50 in FIG. 3.

FIG. 4 shows an example of a table structure as provided in the computer table memory 46 (FIG. 3).

In the context of the contemplated application of the invention, the invention is used to provide a service, wherein a group of subscribers each purchase a service operating as follows:

The service provider rents from a telephone company a group or block of telephone numbers, for example 3000 numbers. The numbers may be consecutive or they may be randomly selected within the constraints provided by the number translation capability of the particular telephone switch serving the area. Each of the e.g. 3000 numbers composed of three office code digits, and the remaining number, composed of four digits, identify one subscriber.

The object of the service is to provide a person-following service, that enables a calling person to find and locate each subscriber to the service.

The service makes use of the fact that the telephone switch has so-called 2-way direct inward dialing trunks (DID trunks) combined with the 3-way calling feature in the switch 11. A 2-way DID trunk with 3-way calling enables a called person being reached to optionally transfer the call by making a hook-switch flash. The flash puts the calling person momentarily on hold and the called person gets dial tone. He can now dial a third person and converse with him. He can next again make a hookswitch flash and reconnect the caller, the called person, and a 3-way conversation can be held. If at this time he releases, i.e. hangs up, the first caller and second called person remain connected together and can converse. No equipment remains tied to the connection at the service provider's location after the release. If instead of hanging up after the three-way conversation the called person flashes again, the second person added to the connection is forcibly disconnected while the first caller and called person remain connected.

It will now readily be seen that a two-way DID trunk with 3-way calling makes it possible to practice the person-following procedure according to the invention.

Figure 5:
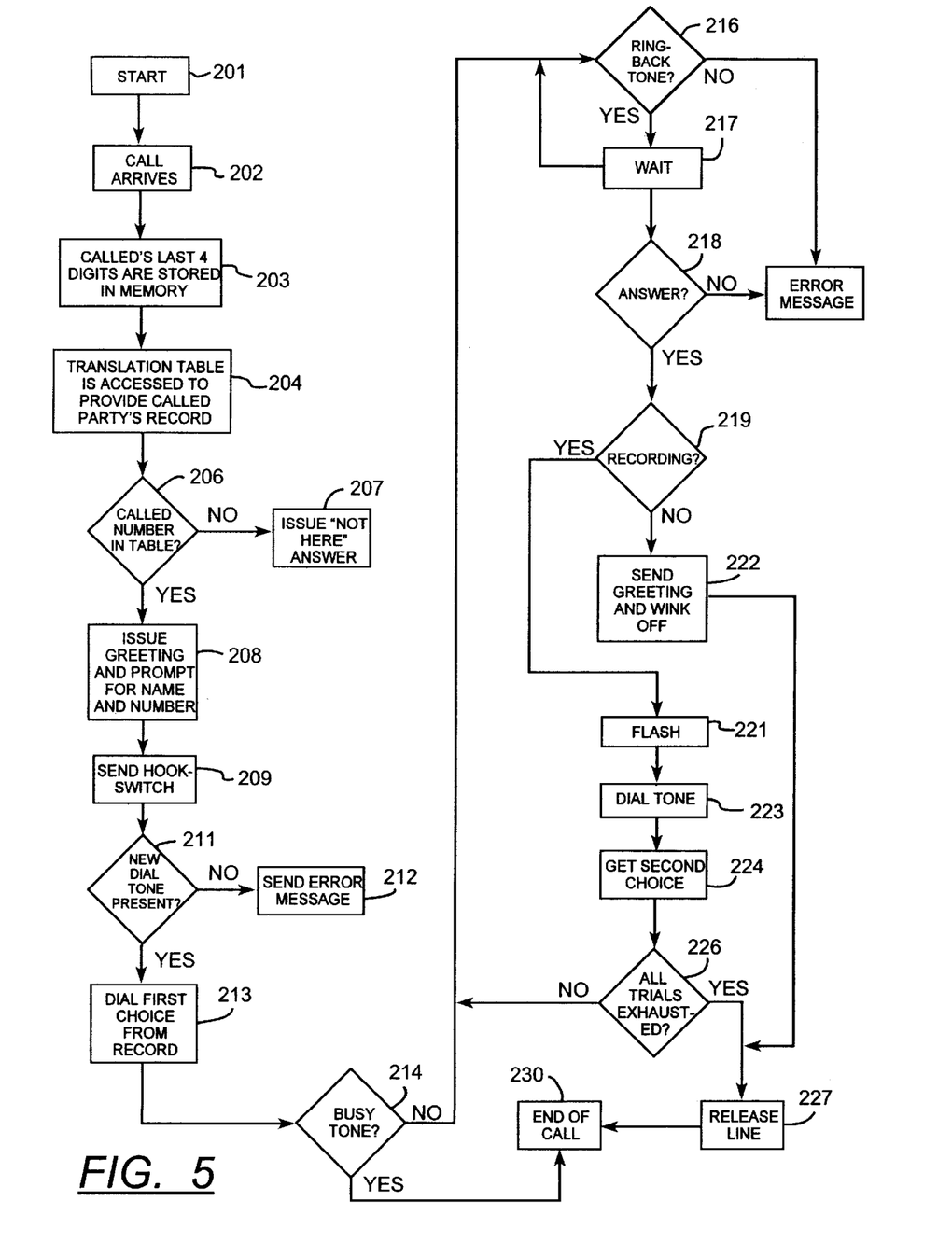
FIG. 5 is a flowchart of the major steps of the control software.

The operation of the invention is next described in reference to the flow-chart shown in FIG. 5.

In FIG. 5, after start 201, a call arrives at the two-way DID trunk T1 in FIG. 1. It arrives in one of the 24 available time slots. No dedicated physical equipment is seized since all operations take place in one of the available 24 time slots. After the call has arrived at step 202 the last four digits of the called party's number arrive in DTMF format in step 203 and is stored in memory, e.g. RAM 28 in digital module 24.

After the last digit has been stored, an interrupt is issued from digital module 24 via ISA bus and bus interface 56, and the last four digits are entered into translation table 46 of PC 50 in FIG. 3. The table 46 translates the last four digits into an arbitrarily assigned address 69 representing a record 72 in the table 71 of FIG. 4. Table 71 is part of the table structure in memory 46 of PC 50 in FIG. 3.

It follows that the four digits of the incoming number represent a maximum of 9999 numbers. The 24 timeslots available in one digital module 24 may not be sufficient to handle as much traffic as created by 9999 numbers, but the digital module 24 can be duplicated with as many digital modules 24 connected in parallel as may be required to handle the incoming traffic. In this case each module will be served by a respective T-1 digital terminal of the digital switch 11 (FIG. 1)

After the four digit number has been translated into an address representing a record 69, dedicated to the calling subscriber, the table structure 71 of the memory tables of the PC 50 is accessed by an interrupt. The record 69 contains a number of record elements which are available for processing the incoming call. The record elements include recorded voice messages 74 available for outgoing messages, storage space 73 for spoken incoming messages, and stored numbers 76 that are available for outdialing in DTMF format by the digital module 24. It follows that a plurality of each of items 72, 73 and 74 may be provided depending on the particular format of the responses, as a particular system may be tailored for particular systems requirements. It follows that more or less extensive response formats may be selected, but a lengthy format may tend to become tiresome and time consuming. The structure of the invention provides flexibility to tailor a memory format to suit any desired mode of operation.

Returning now to the flow chart of FIG. 5, after the translation table 68 has been accessed, the data of record 72 in FIG. 4 for the particular call are availabale through interrupts via interrupt generator 70. In decision step 206 of FIG. 5 a determination is made if a record address 69 is available. If "NO", the call will be released or a "NOT HERE" answer may be returned before the release in steps 206,207. If a valid address is found in step 206, the response in step 208 may be a greeting identifying the called number and one of various prompts. One prompt may offer the telephone number of various parties that may be reached at this number. If, for example, a person is announced as being available at No. "101", the caller may proceed to dial "101" from his tone pad. The person may be reached locally at that number, or that number 101 may be translated into an address 76 in the record 72, which may return with a first choice telephone number at which the called person may be reached. In this case the digital module 24 generates a hookswitch flash in step 209, followed by dial tone from switch 11 in decision step 211. If no dial tone is returned, an equipment error is recorded in step 212, or else the digital module proceeds to dial out in DTMF format the first choice number obtained from table 71 in step 213. After the number is dialed, either busy tone is returned in step 214, resulting in an end of call in step 230, or a ringback tone may be returned in step 216. After a certain wait in step 216, if an answer is received in step 218 a determination is made if the answer is a recording in step 219. If affirmative in step 219, the connection is terminated with a flash off in step 221. If the answer is a human voice, as determined by the logic in the digital module 24, a greeting is transmitted in step 222 followed by a "wink-off" 227, releasing the outgoing connection and leaving the conversing parties connected.

If a recording is determined in step 219, the system may proceed to obtain another alternative number from the record 72 and proceed again to locate the person to be reached, again starting with a hookswitch flash in step 221, receiving dial tone in step 223, obtaining a second choice, such as e.g. a cellular number, in step 224. If the second or a third trial is exhausted in step 226, a release is initiated or still another trial may be initiated at "NO" in step 226. If no more trials are made the line is released in step 227.

It follows that the procedure may be extended to include recorded messages between the various trials, or that the caller can be urged to leave a recorded message to be stored in a vacant voice mail memory space 73 in the record 72.

The system is inherently capable of considerable flexibility in tailoring its responses to nearly any format desired by a person subscribing to the system.

I claim:

1. An automatic person-following system for a telephone switching machine having at least one 2-way DID trunk operative for receiving incoming and transmitting outgoing calls and having a 3-way calling feature for use with said trunk, a bank of data storage cells accessible from said DID trunk each cell having storage capacity for storing at least one pre-recorded message, at least one incoming message and a plurality of pre-recorded telephone numbers associated with a person; signaling means for signaling a hookswitch flash to said DID trunk, and dialing means for automatically dialing a first one of said pre-recorded telephone numbers to said DID trunk after sending said hookswitch flash signal; means for automatically determining whether said person has answered at said first pre-recorded telephone number; and means for automatically sequentially dialing each additional one of said pre-recorded telephone numbers to said DID trunk after sending a hookswitch flash signal until detecting that said person has answered at one of said pre-recorded telephone numbers.

2. Automatic person-following system according to claim 1 wherein said switching machine is a digital switching machine, and said DID trunk is connected with a terminal of said digital switching machine, said terminal operative in pulse code modulation format.

3. Automatic person-following system according to claim 2, further including a digital sound processing module operative for digitally processing sounds in a digital format compatible with said terminal.

4. Automatic person-following system according to claim 3, wherein said digital format is a D-carrier format.

5. Automatic person-following system according to claim 4, wherein said digital sound processing module includes means for digitally processing digital sound signals representing sounds including at least one of dial tone, ringback tone, busy tone, human voice, recorded voice and dual-tone multi-frequency dialing tones.

6. Automatic person-following system according to claim 3, wherein said pulse code modulation format is composed of a plurality of pulse frames, each frame including eight bits representing a binary coded sample of said sounds.

7. Automatic person-following system according to claim 6, wherein said pulse code modulation format includes signaling bits enmeshed in said frames.

8. Automatic person-following system according to claim 7 wherein signaling bits represent one of on-hook and off-hook condition of said hookswitch flash.

9. Automatic person-following system according to claim 3, wherein said pulse code modulation format includes companding of said sound.

10. Automatic person-following system according to claim 8, wherein said hookswitch flash is equal to a timed absence of said signaling bit.

11. Automatic person-following system according to claim 3, further including a digital computer operative for digitally communicating with said sound processing module.

12. Automatic person-following system according to claim 11, wherein said digital computer includes storage means for storing numbers and sounds in retrievable format.

13. Automatic person-following system according to claim 12, wherein said digital computer includes means for presenting said numbers and sounds in response to an interrupt signal from said digital module.

14. Automatic person-following system according to claim 12, wherein said numbers and sounds are in the form of records, each record having an address, and storage means for storing said pre-recorded message, said incoming message and said pre-recorded telephone number.

15. Automatic person-following system according to claim 14 wherein said pre-recorded telephone number is a called number.

16. Automatic person-following system according to claim 1, wherein said pre-recorded message includes at least a greeting and a voice directory.

* * * * *